C. A. PETERSEN.
BLIND FASTENER.
APPLICATION FILED APR. 23, 1917.
1,237,089.
Patented Aug. 14, 1917.
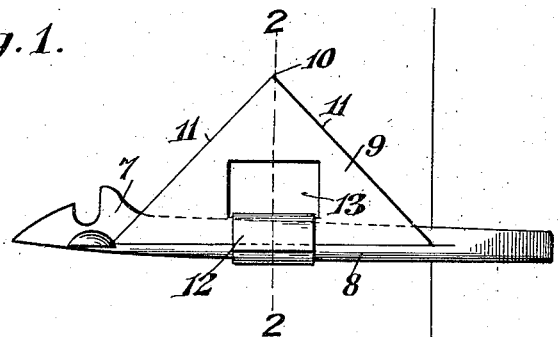
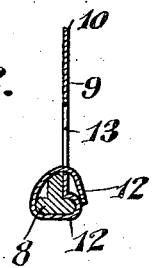
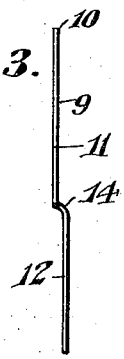
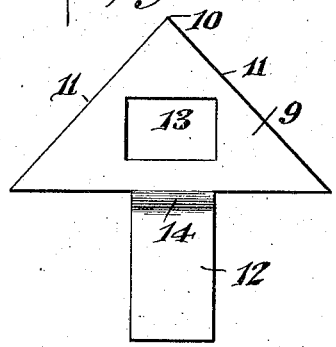
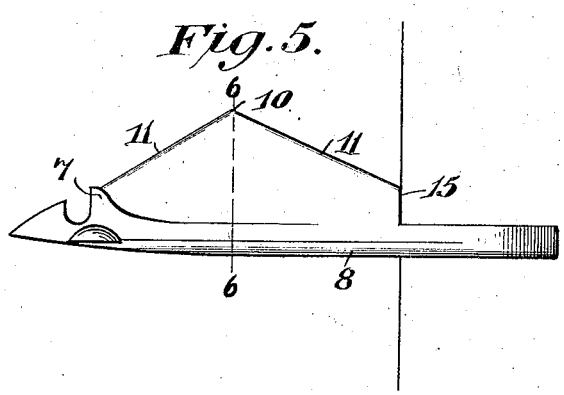
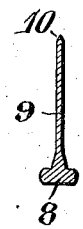
WITNESSES
Jas. K. McCathran
Lewis Eberly
Christian A. Petersen, INVENTOR
BY  C. G. Siggers
ATTORNEY

UNITED STATES PATENT OFFICE.

CHRISTIAN ALFRED PETERSEN, OF BEVERLY, MASSACHUSETTS, ASSIGNOR OF ONE-HALF TO LAURITZ A. PETERSEN, OF BEVERLY, MASSACHUSETTS.

BLIND-FASTENER.

1,237,089.

Specification of Letters Patent.

Patented Aug. 14, 1917.

Application filed April 23, 1917. Serial No. 163,943.

*To all whom it may concern:*

Be it known that I, CHRISTIAN A. PETERSEN, a citizen of the United States, residing at Beverly, in the county of Essex and State of Massachusetts, have invented a new and useful Blind-Fastener, of which the following is a specification.

My invention relates to blind fasteners, and has for its object to provide a simple, inexpensive and easily applied guard which will prevent bird nuisance around dwellings where the old style of blind fastener is employed.

The invention consists in providing a blind fastener of the ordinary type with an upstanding ridge or guard of such length as to extend from the wall of a dwelling to the blind, and of such height and shape as will be found effective to prevent sparrows and other birds from perching behind the blind.

In constructing my invention, I may either form this ridge or projection separate from the blind fastener or integral therewith.

In the drawing:—

Figure 1 is a side elevation showing the preferred form of my invention.

Fig. 2 is a transverse sectional view of the same taken on the line 2—2 of Fig. 1.

Fig. 3 is an edge view of the guard before the same has been applied.

Fig. 4 is a plan view of the same.

Fig. 5 is a side elevation of a modification showing the ridge or projection formed integral with the blind fastener.

Fig. 6 is a transverse sectional view taken on the line 6—6 of Fig. 5.

Similar reference numerals designate corresponding parts in all the figures of the drawing.

Referring to the drawing, 7 designates the body of a blind fastener, which may be of any well known type, and in this instance is provided with a shank 8 which is T-shaped in cross-section, (Fig. 2), and forms a support for the guard 9. This guard, which is made of sheet metal, is approximately triangular in shape, and has one of its side edges resting on the inner edge of the shank, so as to present a vertically disposed point 10 at the apex, and diverging thin side edges 11, which are inclined downwardly and are of such a length as to traverse substantially the entire space between the dwelling and the blind.

Extending from the lower side edge of the guard and made integral therewith, is a securing tongue or strap 12, which is of sufficient length to wrap around the shank of the blind fastener, and then passed through an opening 13 provided in the body of the guard, and then doubled on itself, thereby providing a means for securing the guard to the blind fastener. I have shown the strap offset from the guard at 14, (Fig. 3), which allows the lower side edge of the guard to rest on the shank before the securing tongue or strap is passed around the shank.

In the modification shown in Figs. 5 and 6, the guard is formed integral with the blind fastener, and is provided with a point 10 at the apex, and downwardly diverging thin side edges 11, one of which terminates at a vertically disposed edge or shoulder 15, which forms a stop when the device is applied to a dwelling, the other side edge extending to the engaging end of the fastener.

I have indicated in Figs. 1 and 5 by a vertical line the face of the building, and it will be noted that the guard occupies the entire space from the building to the rear face of the blind, with the result that there is absolutely no place on the fastener for the bird to roost.

From the foregoing description, taken in connection with the accompanying drawing, it will be understood that my invention, when applied to a blind fastener, will effectively prevent birds from perching on the same. It is a well known fact that the feet of birds are tender and shaped to grip round objects, such as twigs and branches, and when brought in contact with sharp surfaces, and especially inclined ones, they are unable to obtain a footing and are compelled to seek other places to roost.

The guard may be made of any flat, thin material and sold with, or separate from the blind fastener, to suit the demands of the public.

What is claimed is:—

1. A blind fastener having as a fixed part thereof a vertically and longitudinally disposed angular guard formed of thinner material than the fastener and terminating at its apex in a point in the same vertical plane as the fastener, with downwardly diverging side edges leading from the apex at such an inclination and of such length as to extend from the point where the fastener emerges from the building to the point where the blind engages the fastener so that the guard occupies the space between the building and the blind, when the device is applied in position.

2. A guard attachment for blind fasteners comprising a body formed of thin sheet metal arranged vertically, with means for securing said body to the fastener in the same vertical plane therewith, said guard having a pointed top and downwardly diverging side edges of a length to extend from the point where the fastener emerges from the building to the point where the blind engages the fastener, thereby extending entirely across the space between the building and the blind when the device is applied in position.

3. A guard attachment for blind fasteners comprising a flat body formed of thin sheet metal of such a length as to extend across the space between a dwelling and a blind when applied in position, said guard being made triangular in shape and having an aperture and a securing strap, said strap being formed integral with the body and adapted to encircle the shank of the blind fastener with the end of the strap passed through the said aperture and bent down, thereby holding the guard securely in place.

4. In combination with a blind fastener having its shank made T-shaped in cross-section, a guard attachment of triangular form provided with a straight lower edge to rest upon the shank of the blind fastener, and upwardly inclined side edges terminating in a point, said guard having formed integral therewith and offset therefrom a strap for securely holding the guard in position, and an opening in the guard to receive the end of the strap after it has been passed around the shank.

In testimony, that I claim the foregoing as my own I have hereto affixed my signature in the presence of two witnesses.

CHRISTIAN ALFRED PETERSEN.

Witnesses:
LAURITO A. PETERSEN,
LUCY BECK.

Copies of this patent may be obtained for five cents each, by addressing the "Commissioner of Patents, Washington, D. C."